(12) United States Patent
Tashiro

(10) Patent No.: US 8,666,583 B2
(45) Date of Patent: Mar. 4, 2014

(54) CONTROL DEVICE FOR HYBRID VEHICLE

(71) Applicant: Denso Corporation, Kariya (JP)

(72) Inventor: Tsutomu Tashiro, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 13/765,074

(22) Filed: Feb. 12, 2013

(65) Prior Publication Data

US 2013/0211649 A1 Aug. 15, 2013

(30) Foreign Application Priority Data

Feb. 13, 2012 (JP) .................................... 2012-28698

(51) Int. Cl.
*B60W 20/00* (2006.01)
(52) U.S. Cl.
USPC ............................ 701/22; 701/102; 180/65.28
(58) Field of Classification Search
USPC ..................................... 701/22, 36, 101, 102; 180/65.265–65.29; 903/930
See application file for complete search history.

(56) References Cited

U.S. PATENT DOCUMENTS

| 7,769,505 B2* | 8/2010 | Rask et al. ...................... 701/22 |
| 2011/0109157 A1 | 5/2011 | Tani |
| 2011/0206951 A1* | 8/2011 | Ford et al. ....................... 429/50 |

FOREIGN PATENT DOCUMENTS

JP 2010-241190 10/2010

OTHER PUBLICATIONS

U.S. Appl. No. 13/765,091 of Tashiro, filed Feb. 12, 2013.

* cited by examiner

*Primary Examiner* — Richard Camby
(74) *Attorney, Agent, or Firm* — Nixon & Vanderhye PC

(57) ABSTRACT

A control device for a hybrid vehicle includes setting unit and supplied heat amount control unit. The setting unit sets the amount of heat for heating supplied by an electric heating system and a heater core such that a battery SOC and coolant temperature are arranged at a predetermined operating point after a predetermined time. The control unit controls this amount of heat based on the setting by the setting unit. The predetermined point is an operating point, which is the closest to a line passing through a predetermined value in a battery SOC target range and a predetermined value in a coolant temperature target range and having a preset change rate, and which is settable within the predetermined time. The change rate is the same as a gradient of an approximate line in case of selection of any one engine operating point on an optimum fuel economy line.

2 Claims, 7 Drawing Sheets

CONTROL DEVICE FOR HYBRID VEHICLE

CROSS REFERENCE TO RELATED APPLICATION

This application is based on Japanese Patent Application No. 2012-28698 filed on Feb. 13, 2012, the disclosure of which is incorporated herein by reference.

TECHNICAL FIELD

The present disclosure relates to a control device of a hybrid vehicle.

BACKGROUND

One control device of a hybrid vehicle is disclosed in patent document 1 (JP-A-2010-241190). This control device predicts a warming-up time of an engine and a charging time of a battery at the time of cold-starting the engine and extracts a set of operating points in which an engine warming-up completion timing and a battery charging completion timing are included within a given range and performs a load operation at any one of the operating points of the extracted set.

The conditions of cold-starting the engine are not constant but are variously changed. For example, only by adding a load of generating electricity to a load of cold-starting the engine, the charging of the battery is completed before the warming-up of the engine is completed or the warming-up of the engine is completed before the charging of the battery is completed.

Regarding this, according to the control device of the hybrid vehicle disclosed in the patent document 1 (JP-A-2010-241190), the warming-up of the engine and the charging of the battery are surely completed within a given range. Hence, this can eliminate a continuous idling operation of no load and a continuous release of thermal energy by the load operation. As a result, at the time of cold-starting the engine, by decreasing a difference between the engine warming-up completion timing and the battery charging completion timing, it is possible to reduce fuel consumption at a low efficiency and hence to improve a fuel economy.

By the way, in a hybrid vehicle using an engine and a motor generator as a driving source for driving the vehicle, the engine is intermittently driven under a low-load driving condition, so when heating using the coolant of the engine as a heat source is performed, a coolant temperature is low and an amount of heat for the heating is short. For this reason, in a case where the heating is performed under the low-load driving condition, generally, the engine is operated to increase the coolant temperature and further an electric heating system is operated to make up for the shortage of the amount of heat for the heating.

However, in the related art, an amount of heat for the heating that is supplied by the heating using the coolant of the engine as a heat source and an amount of heat for the heating that is supplied from the electric heating system are not controlled in consideration of a change in the coolant temperature and a change in the state of charge of a battery at the time of operating the heating.

For this reason, when the electric heating system is continuously used as a heat source, the coolant temperature is sufficiently increased but the state of charge of the battery is reduced (heat is adequate and electricity is short), or when the coolant temperature is comparatively low and the coolant of the engine is continuously used as the heat source, the state of charge of the battery is within an adequate range but the coolant temperature becomes lower (heat is short and electricity is adequate).

In this way, in a case where a balance between the coolant temperature and the state of charge of the battery becomes bad, in order to bring both of the coolant temperature and the state of charge of the battery into target ranges, it can be thought to select an engine operating point at which a heat generation ratio is large in the operation control of the engine, or as shown in patent document 1 (JP-A-2010-241190), to select an engine operating point in an engine operating region in which an engine coolant temperature at which a warming-up operation is completed and the state of charge of the battery at which a charging operation is completed are reached at the same time. However, when the engine operating point like this is selected, a fuel consumption will be increased.

Here, in the patent document 1 (JP-A-2010-241190), an engine operating region is extracted in which the engine coolant temperature at which the warming-up operation is completed and the state of charge of the battery at which the charging operation is completed are reached at the same time and an engine operating point at which the fuel consumption becomes minimal is selected in the engine operating region. However, in the first place, the extracted engine operating region is greatly separate from operating points selected from a viewpoint of minimizing the fuel consumption among all possible engine operating points, so that as compared with these operating points, the engine operating points selected as in the patent document 1 (JP-A-2010-241190) are increased in the fuel consumption.

SUMMARY

The present disclosure addresses at least one of the above issues.

According to the present disclosure, there is provided a control device for a hybrid vehicle. The hybrid vehicle includes an engine, a battery, a motor generator, a heater core, and an electric heating system. The engine is configured to output driving force for driving the vehicle and driving force for generating electricity. The battery is charged with electricity and discharges electricity. The motor generator is capable of outputting driving force for driving the vehicle by the electricity discharged from the battery and is capable of generating electricity by the driving force outputted from the engine to supply the battery with electricity. The heater core is configured to supply an interior of a compartment of the vehicle with heat for heating which is taken out of coolant of the engine. The electric heating system is configured to supply the interior of the compartment of the vehicle with heat for heating by making use of the electricity supplied from the battery. The control device is disposed in the hybrid vehicle and includes a setting means and a supplied heat amount control means. The setting means is for setting an amount of heat for heating supplied by the electric heating system and the heater core. When vehicle heating is in operation and coolant temperature is lower than a predetermined temperature, on an assumption that the vehicle heating using at least one of the electric heating system and the heater core is performed for a predetermined period of time, the setting means sets the amount of heat for heating supplied by the electric heating system and the heater core in such a way that a state of charge of the battery and the coolant temperature are arranged at a predetermined engine operating point after the predetermined period of time. The supplied heat amount control means is for controlling the amount of heat for heating supplied by the electric heating system and the heater core based on the setting by the setting means. when expressed on a coordinate system having the state of charge of the battery and the coolant temperature as its coordinate axes, the predetermined engine operating point is an engine operating point for the state of charge of the battery and the coolant temperature, which is the closest to a line passing through a predetermined value in a target range of the state of charge of the battery and a predetermined value in a target range of the coolant temperature and having a preset change rate, and which is settable within the predetermined period of time. The change rate is the same as a gradient of an approximate line that indicates changes of the state of charge of the battery and the coolant temperature in a case of selection of any one of a set of engine operating points at which fuel consumption is minimal relative to shaft output of the engine among engine operating points having the same shaft output of the engine while the vehicle is traveling in a traveling pattern that is preset as a low-load drive of the vehicle including a travel stop of the vehicle when the vehicle heating is stopped.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
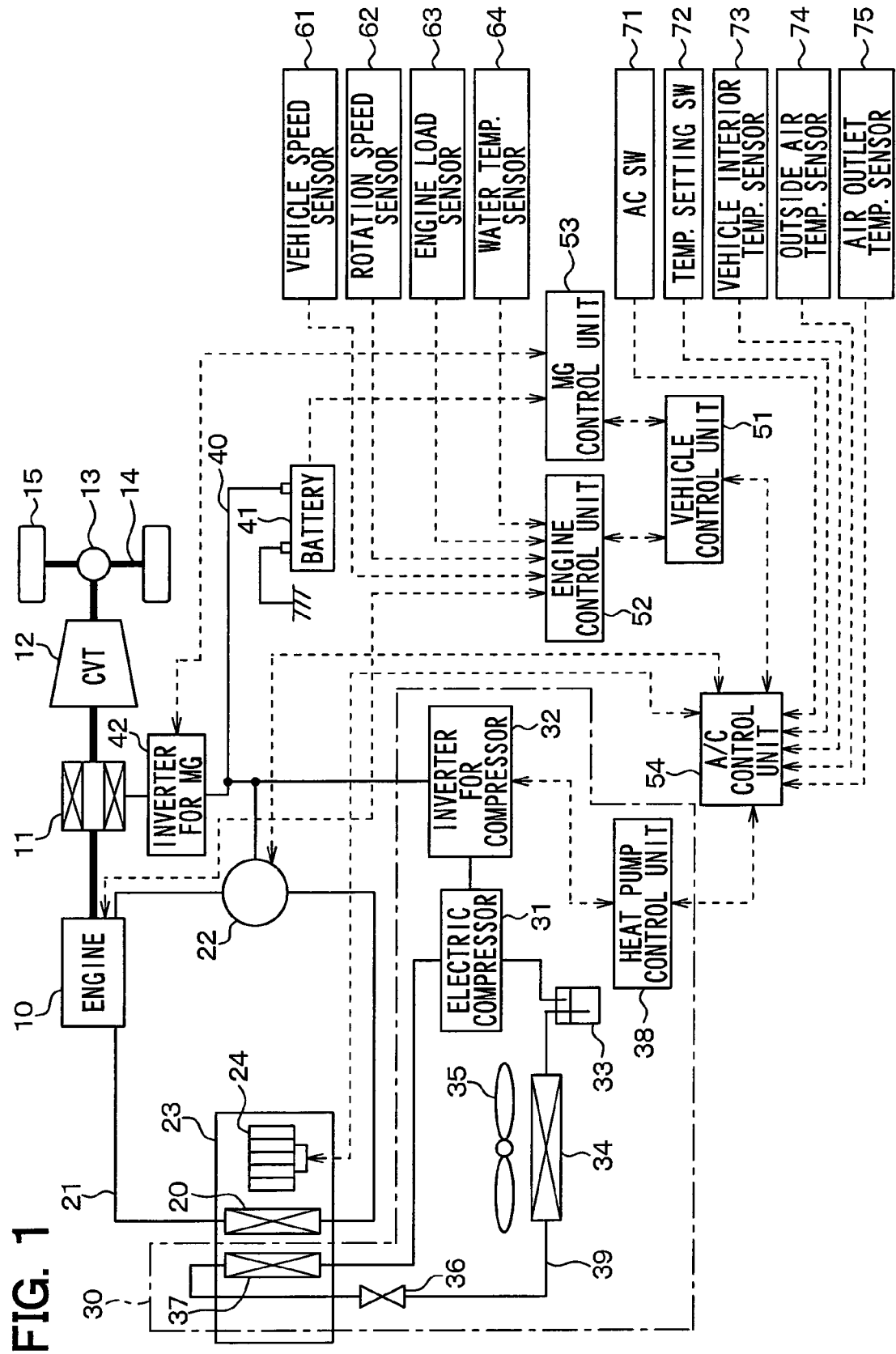
FIG. 1 is a diagram to show a schematic construction of a general system mounted in a hybrid vehicle in an embodiment.

A schematic construction of a general system mounted in a hybrid vehicle in an embodiment will be shown in FIG. 1. The hybrid vehicle in the present embodiment is provided with an engine 10 and a motor generator (MG) 11.

The engine 10 outputs a driving force for driving a vehicle and a driving force for making the motor generator 11 generate electricity. The engine 10 is a gasoline engine or a diesel engine.

The motor generator 11 functions as a motor for driving the vehicle or as a generator. When the motor generator 11 is supplied with electricity, the motor generator 11 is rotatably driven to be able to output the driving force for driving the vehicle. Alternately, the motor generator 11 can generate electricity by using the engine 10 or the like as a power source to thereby charge up a battery 41. The motor generator 11 is of a synchronous type in which a rotor has a permanent magnet embedded therein and in which a stator has a stator coil wound thereon.

When a three-phase alternating current generated by an inverter 42 for the MG is applied to the motor generator 11, the motor generator 11 is controlled. The inverter 42 for the MG is connected to a power circuit 40 and the power circuit 40 has the battery 41 connected thereto. The battery 41 is supplied with electricity from the motor generator 11 or the like (charging) and supplies the electricity to the motor generator 11 or the like (discharging).

The engine 10 is coaxially coupled to the motor generator 11 and the motor generator 11 is coupled to a continuously variable transmission 12 which automatically changes a continuously variable transmission gear ratio according to a vehicle speed and an accelerator opening. An output shaft of the continuously variable transmission 12 is coupled to vehicle wheels 15 via a differential 13 and an axle 14. Here, a clutch may be interposed between the engine 10 and the motor generator 11.

A driving mode of the hybrid vehicle of the present embodiment includes "a motor driving mode", "an engine driving mode", "a motor assist driving mode", and "a driving generating mode". In "the motor driving mode", the hybrid vehicle is driven only by the power of the motor generator. In "the engine driving mode", the vehicle is driven only by the power of the engine. In "the motor assist driving mode", the hybrid vehicle is driven by the power of the engine with the power of the engine being assisted by the motor generator. In "the driving generating mode", the hybrid vehicle is driven by the power of the engine with a portion of the power of the engine being used as the power for making the motor generator generate the electricity.

The hybrid vehicle of the present embodiment is provided with a heater core 20 and a heat pump system 30 as a heating apparatus.

The heater core 20 is a heating unit for taking out heat from an engine coolant and for supplying the heat for heating to an interior of a vehicle compartment and is a heat exchanger that is housed in an air conditioner case 23 of a vehicular air conditioner and that exchanges heat between the engine coolant and a feed air fed to the interior of the vehicle compartment. The air conditioner case 23 houses a blower 24 for feeding air to the interior of the vehicle compartment.

The engine 10 has a water jacket formed in a cylinder block and in a cylinder head. The engine coolant is circulated and supplied to the water jacket, whereby the engine 10 is cooled. To the water jacket is connected a coolant circulation passage 21 made of a coolant pipe or the like and the coolant circulation passage 21 is provided with an electric pump 22 for circulating the engine coolant. By changing a discharge rate of the electric pump 22, a flow rate of the engine coolant circulated in the coolant circulation passage 21 is regulated.

The coolant circulation passage 21 is provided in such a way as to be extended from an exit side of the engine 10 to the heater core 20 (heat exchange part) and to be returned again to the engine 10 via the heater core 20. The air fed from the blower 24 is passed through the heater core 20 to exchange heat with the coolant, thereby being heated and made into hot air. Then, the hot air is blown into the interior of the vehicle compartment from an air outlet. In this construction, by controlling the discharge rate of the electric pump 22 and a feed air volume of the blower 24, an amount of heat to be supplied from the coolant to the interior of the vehicle compartment via the heater core 20.

The heat pump system 30 is an electric heating system for supplying heat for heating to the interior of the vehicle compartment by the use of electricity. The heat pump system 30 is provided with an electric compressor 31, an inverter 32 for a compressor, an indoor heat exchanger 37 (heat exchange part), an outdoor heat exchanger 34, an expansion valve 36, an accumulator 33, a refrigerant circulation passage 39 made of a refrigerant pipe or the like and for connecting these parts, and a heat pump control unit 38.

The electric compressor 31 compresses the refrigerant to thereby heat the refrigerant and discharges the heated refrigerant to the indoor heat exchanger 37. The electric compressor 31 is driven by electricity supplied from the inverter 32 for a compressor. The inverter 32 for a compressor is controlled by the heat pump control unit 38.

The indoor heat exchanger 37 is a heat exchanger that is arranged in the air conditioner case 23 of the vehicular air conditioner and that exchanges heat between the coolant discharged from the electric compressor 31 and the feed air to be fed to the interior of the vehicle compartment. When the air fed from the blower 24 is passed through the indoor heat exchanger 37, the air exchanges heat with the refrigerant, thereby being heated and made into hot air. Then, the hot air is blown off into the interior of the vehicle compartment from the air outlet. At this time, the refrigerant exchanges heat with the air, thereby being cooled. The refrigerant after passing through the indoor heat exchanger 37 has pressure reduced by the expansion valve 36 and flows into the outdoor heat exchanger 34.

The outdoor heat exchanger 34 is a heat exchanger that is arranged outside the vehicle compartment and that exchanges heat between the refrigerant and outside air. The outdoor heat exchanger 34 has the outside air fed thereto by a fan 35. The refrigerant having pressure reduced exchanges heat with the outside air in the outdoor heat exchange 34, thereby being heated. The heated refrigerant passes through the accumulator 33 and flows into the electric compressor 31.

In this construction, the driving state of the electric compressor 31 is controlled, whereby the amount of heat to be supplied from the heat pump system 30 to the interior of the vehicle compartment via the indoor heat exchanger 37 is controlled.

The hybrid vehicle of the present embodiment is provided with control units such as a vehicle control unit 51, an engine control unit 52, an MG (motor generator) control unit 53, and an air conditioning control unit 54. Each of these control units 51 to 54 is mainly constructed of a microcomputer including a CPU, a ROM, a RAM, and the like, and executes various kinds of control programs stored in the ROM to thereby perform various kinds of controls.

The engine control unit 52 controls a driving state of the engine 10 on the basis of detection signals inputted from various kinds of sensors. The various kinds of sensors include a vehicle speed sensor 61 for detecting a speed of the vehicle, a rotation speed sensor 62 for detecting a rotation speed of the engine 10, an engine load sensor 63 for detecting a load of the engine 10 such as an intake air volume and an intake pipe negative pressure, and a coolant temperature sensor 64 for detecting the temperature of the coolant in the water jacket. Specifically, the engine control unit 52 performs a fuel injection control by a fuel injection valve, an ignition timing control by an ignition device, a valve timing control by a valve drive mechanism on an intake side and on an exhaust side, and an intake air volume control by a throttle valve.

The MG control unit 53 controls a driving state of the motor generator 11. Further, the MG control unit 53 calculates an SOC on the basis of: a measured value of an output current of the battery 41 measured by a current sensor; and a predetermined maximum capacity of the battery 41. Specifically, the measured value of the current sensor is integrated and the SOC is calculated as a ratio of the integrated value of the measured value to the predetermined maximum capacity of the battery 41. The calculated SOC is outputted to the vehicle control unit 51. Hence, in the present embodiment, the MG control unit 53 corresponds to a battery state-of-charge detection means for detecting the state of charge of the battery 41.

The air conditioning control unit 54 controls the electric pump 22, the blower 24, and the heat pump control unit 38 on the basis of signals inputted from various kinds of sensors and from various kinds of switches. The various kinds of sensors and the various kinds of switches include an A/C switch 71 for turning on and off an air conditioner, a temperature setting switch 72 by which a driver sets a target value of a vehicle interior temperature (target temperature), a vehicle interior temperature sensor 73 for detecting a vehicle interior temperature, an outside air temperature sensor 74 for detecting an outside air temperature, and an air outlet temperature sensor 75 for detecting a temperature (air outlet temperature) of air-conditioned air fed from the heater core 20 or the indoor heat exchanger 37 to the interior of the vehicle compartment via an air conditioner outlet.

In order to manage the driving and the energy of the vehicle, the vehicle control unit 51 outputs a target engine torque command and a target engine rotating speed command to the engine control unit 52 and outputs a target MG torque command and a target MG rotating speed command to the MG control unit 53 and outputs a speed change command to a transmission control unit (not shown) and outputs a cooperation control command with a regeneration brake to a brake control unit (not shown) and provides the air conditioning control unit 54 with instructions of an amount of heat for heating that the electric heating system 30 is to supply and an amount of heat for heating that the heater core 20 is to supply.

A control process of the vehicle control unit 51 is divided into a driving control process and an energy management process. Of these two processes, the driving control process calculates the target engine torque command, the target engine rotating speed command, the target MG torque command, the target MG rotating speed command, the speed change command, and the cooperation control command with a regeneration brake, which are commands relating to the driving, in such a way that an acceleration/deceleration request of the driver is satisfied and that the engine 10 is driven at a high efficient operating point according to an accelerator pedal operation by the driver and to the states of respective components and systems of the vehicle and a command from the energy management process. On the other hand, the energy management process determines the amount of heat for heating that the electric heating system 30 is to supply and the amount of heat for heating that the heater core 20 is to supply in such a way that the electricity and the heat are suitably stored in the battery 41 and in the coolant respectively in consideration of electricity to be inputted to and outputted from the battery 41 that stores the electricity and heat to be inputted to and outputted from the coolant that stores the heat. The energy management process provides the air conditioning control unit 54 with the amount of heat for heating that the electric heating system 30 is to supply and the amount of heat for heating that the heater core 20 is to supply, which are determined in this way, and also provides the driving control process with an instruction.

The vehicle control unit 51 has information relating to a heating operation (heating is ON or OFF) inputted from the air conditioning control unit 54.

Next, the contents of the energy management process will be described. The energy management process is a process for managing the storage of electricity in the battery 41 and the storage of heat the coolant in suitable states. To realize this, the energy management process manages the SOC (State of Charge) for the battery 41 and manages a coolant temperature for the coolant.

First, a target SOC range and a target coolant temperature range (target range of the coolant temperature) are previously set (initial setting). That is, an upper limit and a lower limit are previously set for the target SOC and the target coolant temperature, respectively.

Figure 2A:
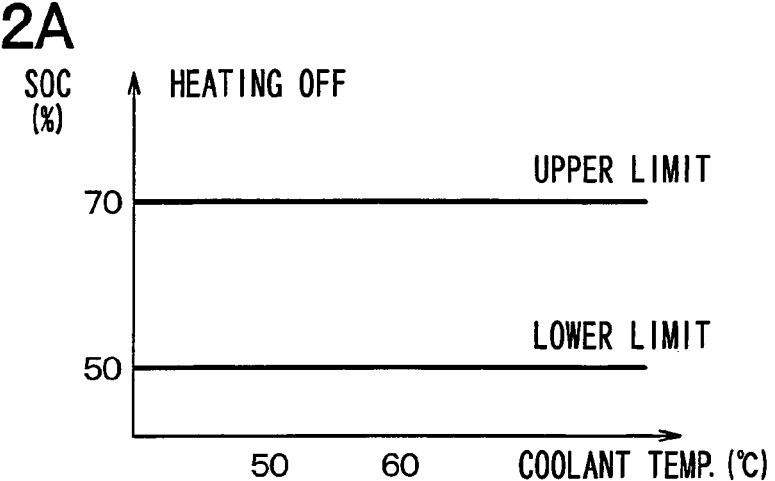
FIG. 2A is a map for determining a target SOC range when heating is OFF, which is used in the embodiment.

The target SOC range is set at different ranges between when heating is ON and when heating is OFF. FIG. 2A is a map for determining a target SOC range used when the heating is OFF and FIG. 2B is a map for determining a target SOC range used when the heating is ON.

As shown in FIG. 2A, when the heating is OFF, the upper limit and lower limit of the target SOC range are set at constant temperatures, for example, at 70% and 50% regardless of the coolant temperature. At this time, the upper limit of the target SOC range is set at a given value lower than 100%. The reason is as follows: the SOC is not measured directly but is calculated, so an error is caused; hence, the upper limit of the SOC range is set in consideration of the error. Further, this is because even if the target SOC is not 100%, if the SOC is a state close to 100%, the battery 41 easily deteriorates.

Figure 2B:
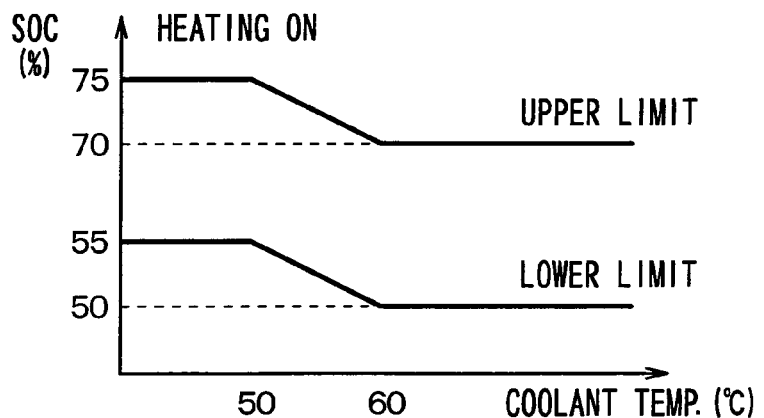
FIG. 2B is a map for determining a target SOC range when the heating is ON, which is also used in the embodiment.

As shown in FIG. 2B, when the heating is ON, in a temperature range in which the coolant temperature is such a comparatively low temperature that makes it difficult to take a sufficient amount of heat from the heater core 20, the upper limit and the lower limit of the target SOC are set high in order to secure electricity consumed by the heat pump system 30, that is, the electric heating system 30. Specifically, in a range in which the coolant temperature is a first given temperature or more, for example, 60° C. or more, the upper limit and the lower limit of the target SOC are set at the same upper limit and the same lower limit as when the heating is OFF. In a range in which the coolant temperature is a second given temperature or less, for example, 50° C. or less, the upper limit and the lower limit of the target SOC are set at a higher upper limit and a higher lower limit than when the heating is OFF, for example, 75% and 55%, respectively.

In this way, if the upper limit of the target SOC when the heating is ON is not too close to 100%, the upper limit of the target SOC when the heating is ON can be set slightly higher than the upper limit of the target SOC when the heating is OFF. By the way, in a case where the upper limit of the target SOC is set slightly higher, if the electricity is not consumed and hence the SOC is made too high by the electricity generated, the battery 41 easily deteriorates. In contrast, when the heating is ON, the electricity is consumed by the electric heating system 30, so that even if the upper limit of the target SOC is set slightly higher, the SOC is not made too close to 100%.

On the other hand, the upper limit of the target coolant temperature is set at a constant temperature, for example, at 100° C. regardless of whether the heating is ON or OFF, but the lower limit of the target coolant temperature is set at different temperatures between when the heating is ON and when the heating is OFF. When the heating is OFF, the lower limit of the target coolant temperature is set at a temperature at which the warming-up of the engine is determined to be finished, for example, at 40° C., whereas when the heating is ON, the lower limit of the target coolant temperature is previously set at a temperature at which the heater core 20 can supply heat for heating, for example, at 35 to 50° C. (initial setting).

This temperature depends on the heating capacity of the electric heating system 30. That is, in a case where the amount of heat for heating that the electric heating system 30 can supply is small, a large amount of heat for heating needs to be supplied from the heater core 20, so that the lower limit of the target coolant temperature needs to be kept at a higher temperature and hence is set, for example, at 50° C. On the other hand, in a case where the amount of heat for heating that the electric heating system 30 can supply is large, an amount of heat for heating that the heater core 20 is to supply is small, so that when the warming-up of the engine is finished, the heater core 20 can already supply a sufficient amount of heat for heating. Hence, in this case, even if the heating is ON, the lower limit of the target coolant temperature is set at a temperature equal to or lower than the lower limit of the target coolant temperature when the heating is OFF, for example, at 40° C. or 35° C.

Next, there will be described a determination process of determining an amount of heat for heating that the electric heating system 30 is to supply and an amount of heat for heating that the heater core 20 is to supply, which are provided to the air conditioning control unit 54. A heat distribution of two kinds of heating means of the heater core 20 and the electric heating system 30 is determined, the heater core 20 supplying the heat for heating from heat taken out of the coolant, the electric heating system 30 supplying the heat for heating by the electricity from the battery 41. At this time, in the following manner, an amount of heat for heating that the heater core 20 is to supply and an amount of heat for heating that the electric heating system 30 is to supply are determined in such a way that a predetermined relationship is established between the coolant temperature and the SOC after a given period of time.

This determination process is repeatedly performed only in a case where the heating is ON and the coolant temperature is a given temperature or lower. The case where the coolant temperature is a given temperature or lower means a case where if the heat for heating is supplied only by the heater core 20, the heat for heating is short, and the given temperature is a temperature at which a necessary amount of heat for heating can be continuously sufficiently supplied only by the heater core 20, for example, 60° C. Further, this determination process is performed in a case where the coolant temperature is higher than a temperature at which heating can be started. The temperature at which heating can be started means a coolant temperature at which heating can be started by both of the heater core 20 and the electric heating system 30 and is a temperature that is varied depending on the heating capacity of the electric heating system 30, for example, from 35° C. to 40° C.

Figure 3:
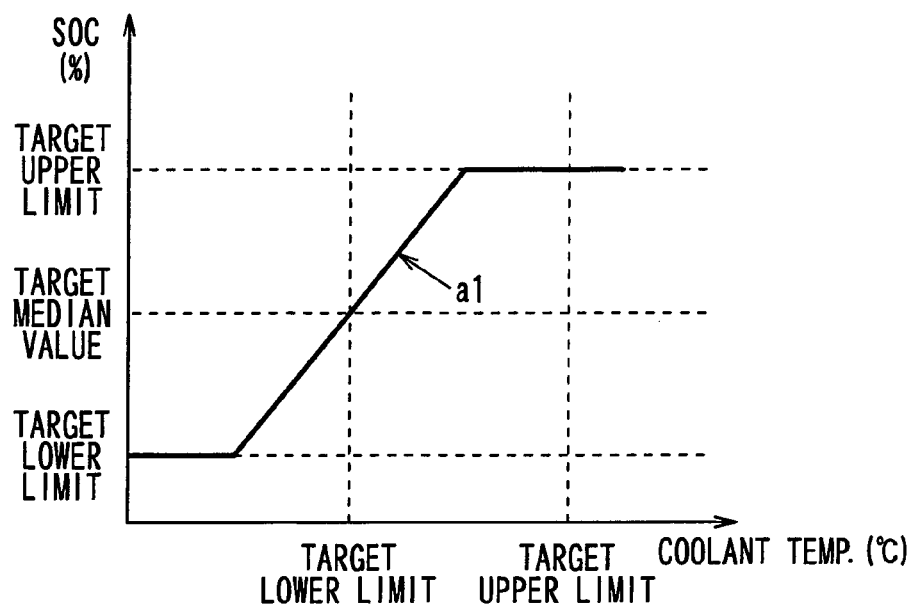
FIG. 3 is a schematic graph to show a target SOC-coolant temperature function used in the embodiment.

First, a target SOC-coolant temperature function (hereinafter referred to as "target function") is set. An example of the target function will be shown in FIG. 3. This target function, as shown in FIG. 3, is expressed on a coordinate system having two axes of coordinates of an SOC and a coolant temperature. Specifically, the target function changes along a straight line passing a point having a coordinate of a median value of a target SOC range and a coordinate of a lower limit of the target coolant temperature and having a given gradient of a1 and is kept at the upper limit or the lower limit of the target SOC when the target function reaches the upper limit or the lower limit of the target SOC.

The target SOC range used at this time is a range between an upper limit and a lower limit of the coolant temperature at this time and the median value of the target SOC range is, for example, 65% when the coolant temperature is 45° C. and is 62.5% when the coolant temperature is 55° C. In this way, the target SOC range and the median value of the target SOC range are different depending on the coolant temperature at that time. The reason why the target function is the straight line passing the median value of the target SOC range is that the SOC needs to be positioned within the target SOC range with an allowance.

The lower limit of the target coolant temperature, as described above, is set in advance by the heating capacity of the electric heating system 30 mounted in the vehicle and is set at, for example, 40° C. The reason why the target function is the straight line passing not the median value but the lower limit of the target coolant temperature is as follows: that is, fuel is consumed to raise the temperature of the coolant; and if the temperature of the coolant is excessively higher, heat radiation loss is caused; hence it is only necessary that a minimum temperature required for the heating is reached.

The given gradient of a1 is a gradient of an approximate straight line when a relationship between the coolant temperature and the SOC in a case where an engine operating point is selected in such a way as to reduce a fuel consumption on a first optimum fuel economy line to be described later when the heating is OFF and the vehicle is driven in a driving pattern previously set as a comparatively low load driving pattern including a driving stop is expressed on the coordinate axes, and the given gradient of a1 is experimentally determined. The reason of the comparatively low load driving pattern is to set a condition under which the temperature of the coolant is kept in a range of 60° C. or less in which the control of the present disclosure is required. In this regard, the gradient of the approximate straight line of expressing a relationship between the coolant temperature and the SOC is varied by a distribution of a driving force for driving the vehicle and a driving force for generating the electricity at a shaft output of the engine, but because the driving pattern is specified and the heating is OFF, a variation in the gradient calculated from the experiment results is within a small range. For example, the gradient is calculated by calculating an average in this range.

Thus, in a case where an operating point of the SOC and the coolant point is positioned on any point on the straight line having the given gradient a1, if an engine operating point on the first optimum fuel economy line is selected to operate the engine 10, a change in the SOC which is caused by generating the electricity by the engine and a change in the coolant temperature which is caused by heating the coolant by the engine are varied along the straight line having the gradient of a1. For this reason, when the amount of heat for heating that the heater core 20 is to supply and the amount of heat for heating that the electric heating system 30 is to supply are set, if the SOC and the coolant temperature are set on the straight line, the engine is driven at the operating point in which the fuel consumption becomes small on the first optimum fuel economy line, whereby the SOC and the coolant temperature can be held on this straight line.

In addition, a prediction period used when the amount of heat for heating that the heater core 20 is to supply and the amount of heat for heating that the electric heating system 30 is to supply are determined in such a way that an operating point will be positioned on the target function in the near future is set in advance from an operating point expressed by the present SOC and the present coolant temperature. This prediction time is a period of time from the present time before which the operating point of the SOC and the coolant temperature needs to be controlled in such a way as to be positioned on the target function and is set within a range from 40 to 120 seconds. An example of a relationship between a prediction period and an SOC will be shown in FIG. 4.

Figure 4:
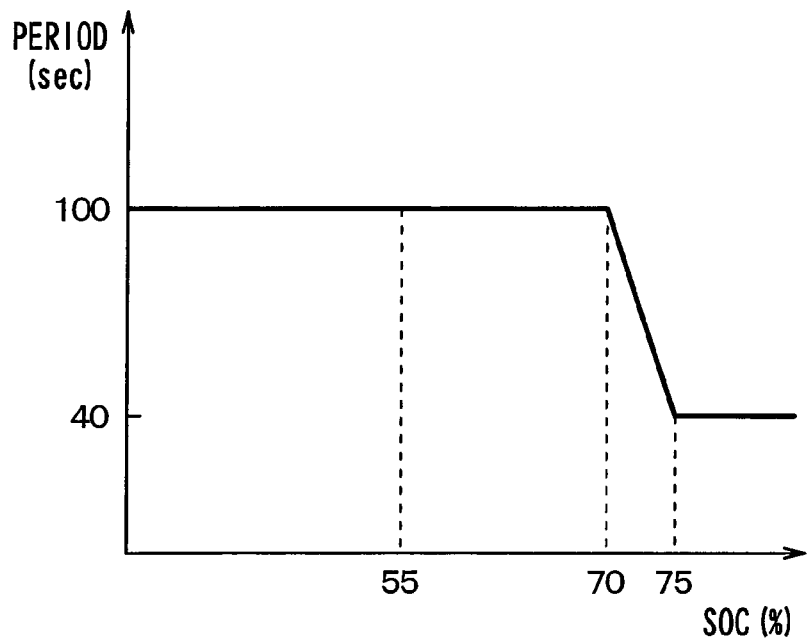
FIG. 4 is a control map to show a relationship between a prediction period and an SOC, which is used in the embodiment.

For example, as shown in FIG. 4, in a range in which the SOC is lower than 70%, a period of 100 seconds is set as a first period, and in a range in which the SOC is higher than 75%, a period of 40 seconds is set as a second period which is shorter than the first period, and in a range in which the SOC is from 70% to 75%, as the SOC becomes higher, the period is set at from 100 to 40 seconds in such a way as to gradually become smaller.

In this way, in a case where the SOC is lower than the upper limit of the target SOC, the first period set longer is used as the prediction period, whereas in a case where the SOC is higher than the upper limit of the target SOC, the second period set shorter than the first period is used as the prediction period. The reason why the first period is set longer is to prevent a problem that the distribution of the amount of heat for heating that the heater core 20 is to supply and the amount of heat for heating that the electric heating system 30 is to supply is greatly changed to impair comfortableness. The reason why the second period is set shorter than the first period is that when the SOC is higher than the target SOC, the SOC needs to be quickly reduced.

Next, a predicted total amount of heat for heating is calculated. This is an amount of heat for heating to be supplied during the prediction period and is a value in a case where a required amount of heat for heating at that time is continued during the prediction period. At this time, the amount of heat for heating that the heater core 20 is to supply and the amount of heat for heating that the electric heating system 30 is to supply are calculated by the use of a heater core model and an electric heating system model, respectively. Each of the heater core model and the electric heating system model is a relationship formula for drawing an output value from an input value and is a formula drawn from an experiment or the like. Here, in place of the relationship formula, a map showing a given relationship between the input value and the output value may be used.

As the heater core model are employed two prediction models, for example, a coolant temperature prediction model and a prediction model of predicting an amount of heat consumed by the coolant. When an amount of heat consumed for heating and a period are inputted to the coolant temperature prediction model, the coolant temperature prediction model outputs a variation in the coolant temperature after the period, whereas when a variation in the coolant temperature and a period are inputted to the prediction model of predicting an amount of heat consumed by the coolant, the prediction model of predicting an amount of heat consumed by the coolant outputs an amount of heat for heating that the heater core is to supply which is to be set during the period. On the other hand, as the electric heating system model are employed two models of an SOC prediction model and a prediction model of predicting an amount of heat for heating that an electric heating system is to supply. When an amount of heat consumed for heating and a period are inputted to the SOC prediction model, the SOC prediction model outputs a variation in battery SOC after the period, whereas an variation in battery SOC and a period are inputted to the prediction model of predicting an amount of heat for heating that an electric heating system is to supply, the prediction model of predicting an amount of heat for heating that an electric heating system is to supply outputs an amount of heat for heating that the electric heating system is to supply during the period.

Then, from among combinations of the SOC and the coolant temperature that will realize the predicted total amount of heat for heating on the assumption that both of the amount of heat for heating that the heater core supplies and the amount of heat for heating that the electric heating system supplies are held at constant values during the prediction period, the SOC and the coolant temperature for realizing an operating point nearest to the target function are selected. That is, a coolant temperature in a case where the predicted total amount of heat for heating is supplied only by the heater core 20 is calculated by the coolant temperature prediction model and an SOC in a case where the predicted total amount of heat for heating is supplied only by the electric heating system 30 is calculated by the SOC prediction model, and in a case where a line of connecting both of the coolant temperature and the SOC, which are calculated by the prediction models, meets the target function at an intersection, the intersection is selected as a target operating point, whereas in a case where the line of connecting both of the coolant temperature and the SOC does not meet the target function, an operating point nearest to the target function is selected as a target operating point.

Figure 5:
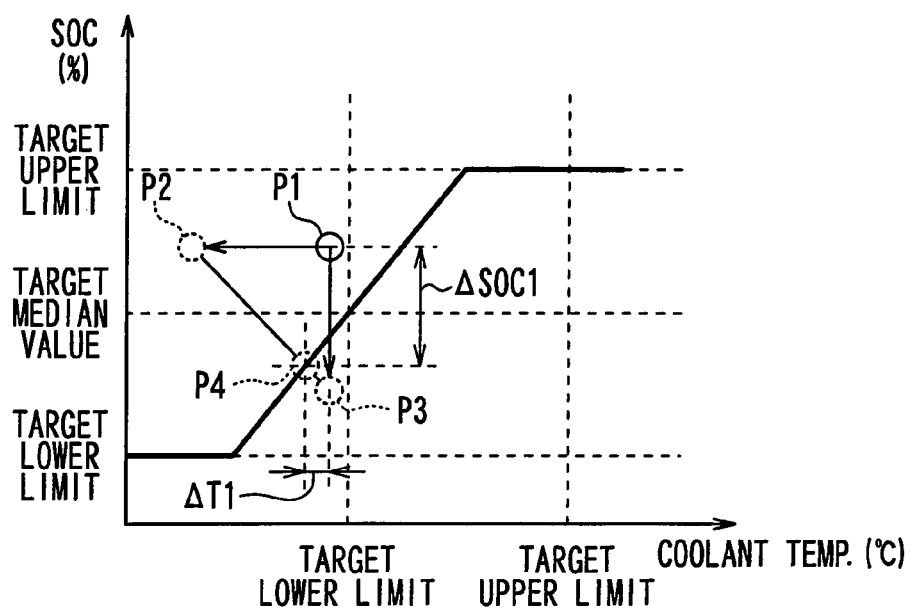
FIG. 5 is a graph to show an example of selecting a target operating point of an SOC and a coolant temperature in the embodiment.
Figure 6:
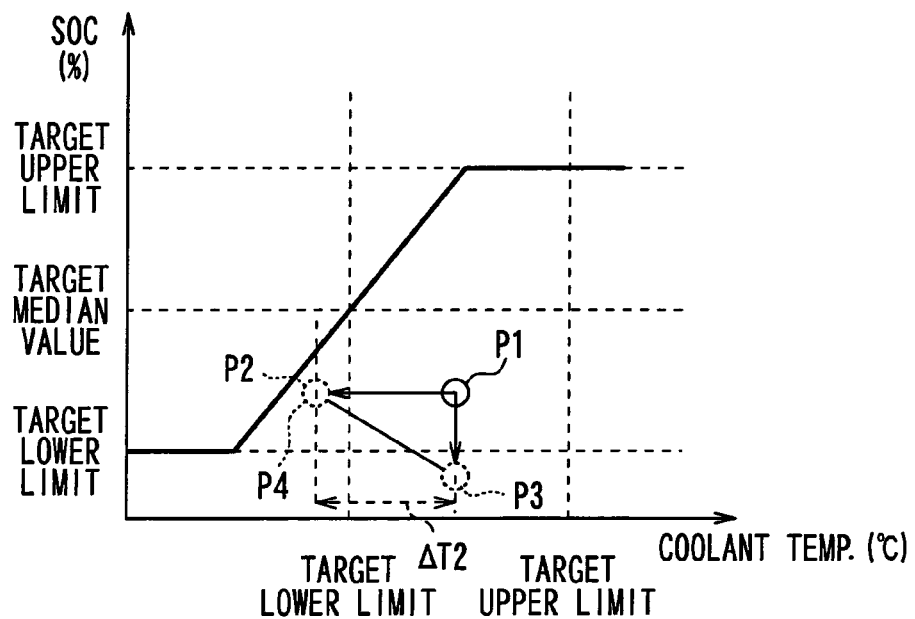
FIG. 6 is a graph to show an example of selecting a target operating point of an SOC and a coolant temperature in the embodiment.

Here, specific examples of a method for selecting a target operating point of an SOC and a coolant temperature will be shown in FIG. 5 and FIG. 6.

For example, as shown in FIG. 5, by calculating a coolant temperature after the supply of the predicted total amount of heat for heating by the heater core 20 on the basis of the present operating point P1, an operating point P2 after a prediction period when the predicted total amount of heat for heating is supplied by the heater core 20 is found. Further, by calculating an SOC after the supply of the predicted total amount of heat for heating by the electric heating system 30 on the basis of the present operating point P1, an operating point P3 after a prediction period when the predicted total amount of heat for heating is supplied by the electric heating system 30 is found. Then, an intersection of a straight line of connecting the operating point P2 and the operating point P3 and the target function is made a target operating point P4 to be selected. A difference in coolant temperature ($\Delta T1$) and a difference in SOC ($\Delta SOC1$) between this target operating point P4 and the present operating point P1 are a temperature variation corresponding to the amount of heat for heating that the heater core 20 is to supply and an SOC variation corresponding to the amount of heat for heating that the electric heating system 30 is to supply, respectively.

Further, as shown in FIG. 6, as in the case of FIG. 5, the operating point P2 after a prediction period when the predicted total amount of heat for heating is supplied by the heater core 20 is found, and the operating point P3 after a prediction period when the predicted total amount of heat for heating is supplied by the electric heating system 30 is found. Then, a straight line of connecting the operating point P2 and the operating point P3 does not meet the target function, so that an operating point P2 nearest to the target function is made a target operating point P4. The target operating point P4 at this time is an operating point that is nearest to the target function among operating points selected from a region of connecting the present operating point P1 and the calculated operating points P2 and P3. A difference in coolant temperature ($\Delta T2$) between this target operating point P4 and the present operating point P1 is a temperature variation corresponding to the amount of heat for heating that the heater core 20 is to supply. In the example shown in FIG. 6, it turns out that the predicted total amount of heat for heating is supplied by the heater core 20.

Next, by using a difference in the coolant temperature and a difference in the SOC between this target operating point P4 and the present operating point P1, for example, $\Delta T1$ and $\Delta SOC1$ shown in FIG. 5 and $\Delta T2$ shown in FIG. 6, the amount of heat for heating that the heater core 20 is to supply and the amount of heat for heating that the electric heating system 30 is to supply are calculated from the prediction model of predicting an amount of heat consumed by the coolant and the prediction model of predicting an amount of heat for heating that an electric heating system is to supply, respectively.

Then, the amount of heat for heating that the heater core 20 is to supply and the amount of heat for heating that the electric heating system 30 is to supply, which are calculated in this manner, are limited by the amount of heat for heating that the heater core 20 can actually supply and by the amount of heat for heating that the electric heating system 30 can actually supply. This is because a maximum amount of heat that the heater core 20 can actually supply and a maximum amount of heat that the electric heating system 30 can actually supply are determined by the coolant temperature and the SOC, for example, when the coolant temperature is comparatively low, if a large amount of heat is removed from the coolant, an occupant gets a feeling that the blown-off air is cold. Here, by comparing the amount of heat for heating that the heater core 20 is to supply and the amount of heat for heating that the electric heating system 30 is to supply, which are calculated in this manner, with the maximum amount of heat that the heater core 20 can supply and the maximum amount of heat that the electric heating system 30 can supply, it is determined whether or not the amount of heat for heating that the heater core 20 is to supply and the amount of heat for heating that the electric heating system 30 is to supply, which are calculated in this manner, are larger than the maximum amount of heat that the heater core 20 can supply and the maximum amount of heat that the electric heating system 30 can supply, respectively.

In a case where the amount of heat for heating that the heater core 20 is to supply and the amount of heat for heating that the electric heating system 30 is to supply, which are calculated in this manner, are not larger than the maximum amount of heat that the heater core 20 can supply and the maximum amount of heat that the electric heating system 30 can supply, the amount of heat for heating that the heater core 20 is to supply and the amount of heat for heating that the electric heating system 30 is to supply, which are calculated in this manner, are used as they are.

Figure 7:
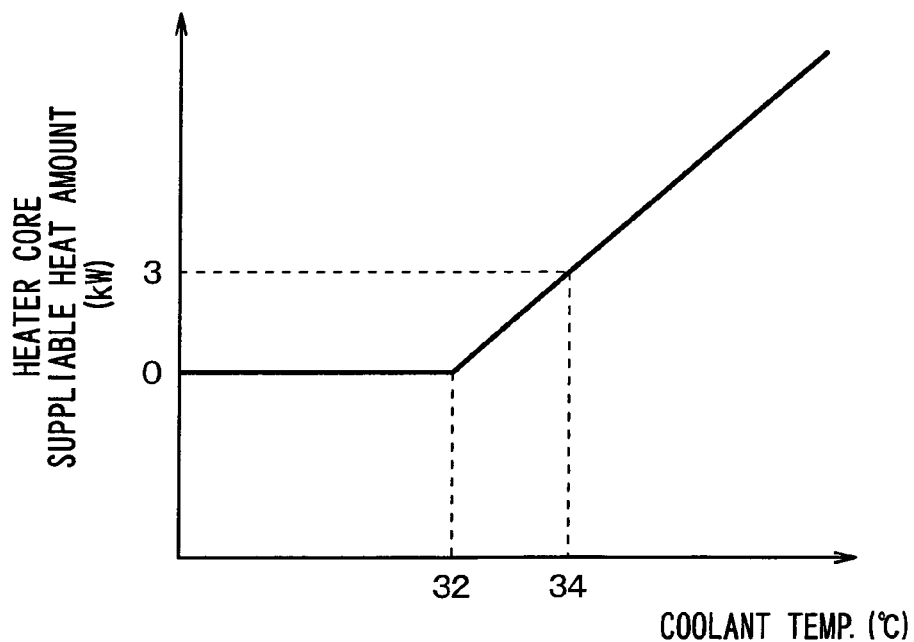
FIG. 7 is a graph to show one example of a relationship between a coolant temperature and an amount of heat that a heater core can supply in the embodiment.

On the other hand, in a case where the amount of heat for heating that the heater core 20 is to supply and the amount of heat for heating that the electric heating system 30 is to supply, which are calculated in this manner, are larger than the maximum amount of heat that the heater core 20 can supply and the maximum amount of heat that the electric heating system 30 can supply, a difference between the amount of heat for heating that the heater core 20 is to supply and the maximum amount of heat that the heater core 20 can supply and a difference between the amount of heat for heating that the electric heating system 30 is to supply and the maximum amount of heat that the electric heating system 30 can supply are calculated. In a case where there is leeway in the amount of heat that the heater core 20 can supply or in the amount of heat that the electric heating system 30 can supply, the calculated difference in the amount of heat is allocated to the heater core 20 or the electric heating system 30 which has the leeway. In FIG. 7 is shown an example of a relationship between the coolant temperature and an amount of heat that the heater core 20 can supply. For example, when the coolant temperature of the target operating point P4 shown in FIG. 5 is 34° C., as shown in FIG. 7, the amount of heat that the heater core 20 can supply when the coolant temperature is 34° C. is 3 kW and if the amount of heat for heating that the heater core 20 is to be supply is 3.5 kW, the amount of heat for heating that the heater core 20 is to be supply is short by 0.5 kW. In this case, if the calculated amount of heat for heating that the electric heating system 30 is to supply is 0.5 kW and the maximum amount of heat that the electric heating system 30 can supply is larger than the 1 kW, the amount of heat for heating that the electric heating system 30 is to supply is set at 1 kW.

However, in a case where even if the maximum amount of heat that the heater core 20 can supply is added to the maximum amount of heat that the electric heating system 30 can supply, the amount of heat is short, both of the maximum amount of heat that the heater core 20 can supply and the maximum amount of heat that the electric heating system 30 can supply are used.

The vehicle control unit 51 outputs the amount of heat for heating that the heater core 20 is to supply and the amount of heat for heating that the electric heating system 30 is to supply, which are determined in this way, to the air conditioning control unit 54. When the heating is ON, the air conditioning control unit 54 controls the amount of heat for heating that the heater core 20 is to supply and the amount of heat for heating that the electric heating system 30 is to supply on the basis of this command from the vehicle control unit 51. Specifically, as for the amount of heat for heating that the heater core 20 is to supply, the air conditioning control unit 54 controls a discharge rate of the electric pump 22 and an air volume of the blower 24, whereas as for the amount of heat for heating that the electric heating system 30 is to supply, the air conditioning control unit 54 controls a driving state of the electric compressor 31. In this way, in the present embodiment, the vehicle control unit 51 may correspond to a means (setting means) for setting an amount of heat for heating that the heater core 20 is to supply and an amount of heat for heating that the electric heating system 30 is to supply, and the air conditioning control unit 54 may correspond to a means (supplied heat amount control means) for controlling an amount of heat for heating that the heater core 20 is to supply and an amount of heat for heating that the electric heating system 30 is to supply.

Figure 8:
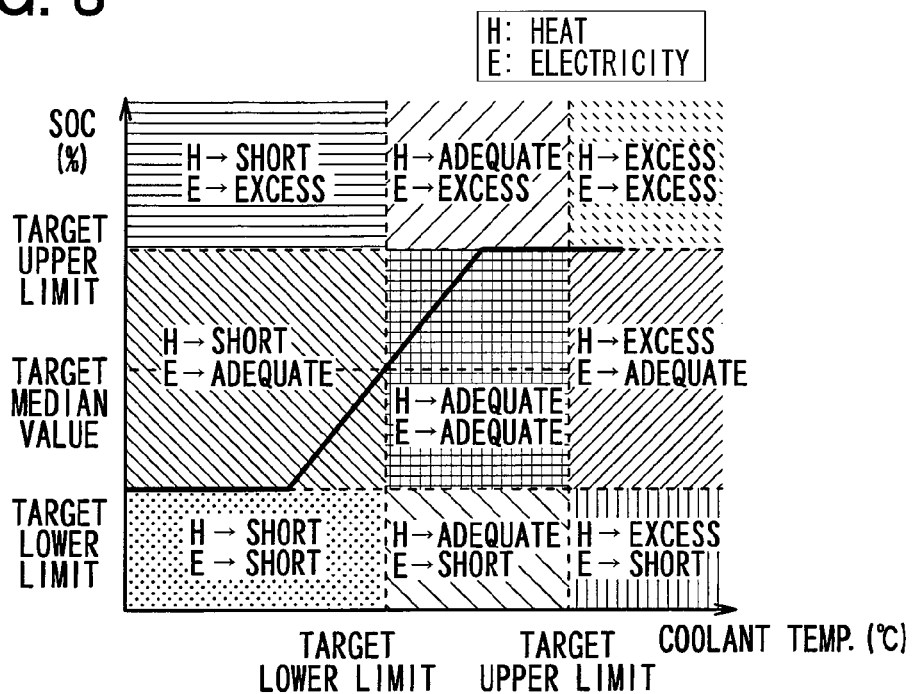
FIG. 8 is a determination map for determining a position of a target operating point of an SOC and a coolant temperature used in the embodiment.

In addition, the vehicle control unit 51 determines a position of this final operating point on a map of the target function. A map for determination will be shown in FIG. 8. The vehicle control unit 51 determines in which region shown in FIG. 8 a position of this final operating point is located and transmits this information to the driving control process.

Next, of the driving control process, a portion performed by information from the energy management process will be described. This is a process in a case where it is determined that the SOC and the coolant temperature cannot be controlled to within a target range only by the control of the air conditioning control unit 54 or in a case where it is determined that a control including the operations of the engine 10 and the motor generator 11 needs to be performed.

In particular, the control of the air conditioning control unit 54 can decrease the SOC and the coolant temperature by consuming the electricity and the heat but cannot increase the SOC and the coolant temperature. For this reason, this process is performed in a case where the SOC and the coolant temperature need to be increased. Further, in a case where the SOC and the coolant temperature are too high, this process is performed also in the case of preventing the electricity and the heat from being further generated.

As described above, the driving control process calculates the target engine torque command, the target engine rotating speed command, the target MG torque command, the target MG rotating speed command, the speed change command, and the cooperation control command with a regeneration brake, which are commands relating to the driving, in such a way that an acceleration/deceleration request of the driver is satisfied and that the engine 10 is driven at a high efficient operating point according to an accelerator pedal operation by the driver and to the states of respective components and systems of the vehicle and a command from the energy management process.

At this time, according to the command from the energy management process, that is, by using the prediction results acquired by the heater core model and the electric heating system model performed by the energy management process, an adequate engine operating point is set in consideration of future.

Figure 9:
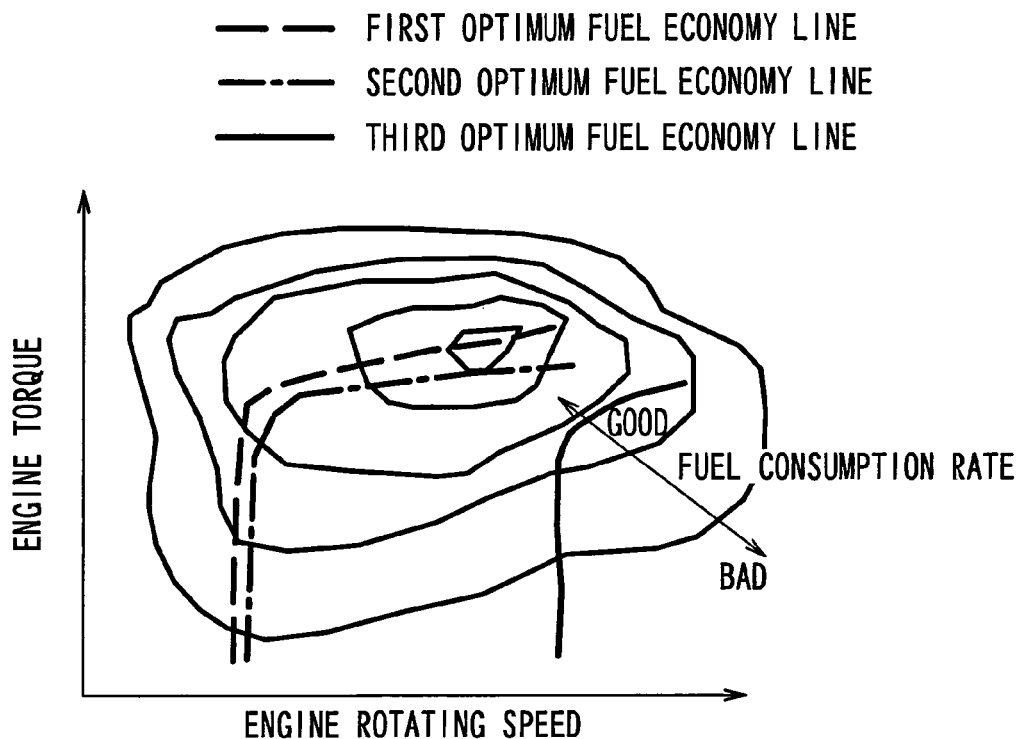
FIG. 9 is an engine operating point map to express a first optimum fuel economy line, a second optimum fuel economy line, and a third optimum fuel economy line as a reference, which are used in the embodiment.

In FIG. 9 will be shown an engine operating point map in which a first optimum fuel economy line and a second optimum fuel economy line, which are used in the present embodiment, and a third optimum fuel economy line as a reference are expressed. Further, formulas 1 to 3 for drawing the first to third optimum fuel economy lines shown in FIG. 9 will be described in the following.

Formula 1=fuel consumption[g/h]/shaft output[kW] (Formula 1)

Formula 2=fuel consumption[g/h]/(shaft output[kW]+ α×coolant heating heat amount[kW]) (Formula 2)

Formula 3=fuel consumption[g/h]/coolant heating heat amount[kW] (Formula 3)

The engine operating point is a combination of an engine torque and an engine rotating speed.

The first optimum fuel economy line shown in FIG. 9 is a set of engine operating points of minimizing the formula 1 on an equi-output power line. That is, the first optimum fuel economy line is a set of engine operating points in which a fuel consumption for the shaft output of the engine 10 becomes minimal among the engine operating points which are equal to each other in the shaft output of the engine 10 (shaft output optimum line).

Figure 10:
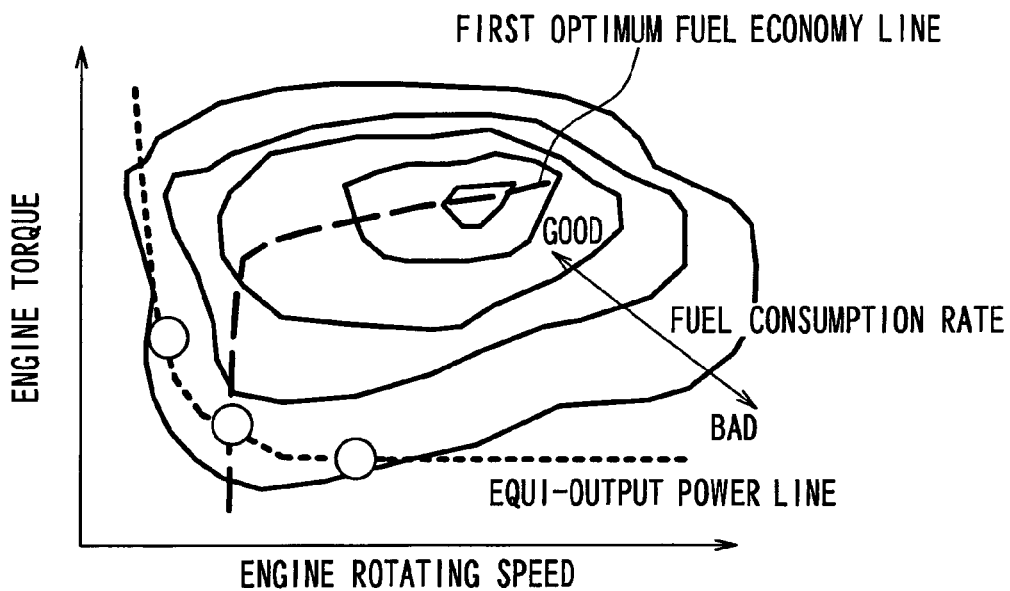
FIG. 10 is an engine operating point map for describing the first optimum fuel economy line shown in FIG. 9.

Here, an engine operating point map for describing the first optimum fuel economy line will be shown in FIG. 10. The engine 10 has, for example, a fuel consumption characteristic shown in FIG. 10, so that the engine 10 is different in the fuel consumption for the same shaft output. For this reason, by the combination of the engine 10 and the continuously variable transmission 12, an engine operating point in which the fuel consumption is small can be set on the equi-output power line, as shown in FIG. 10. A line of connecting the engine operating points in which the fuel consumption is small on the equi-output power line is called an optimum fuel economy line. The first optimum fuel economy line is a set of engine operating points in which the fuel consumption for the shaft output of the engine 10 becomes minimal for each shaft output (shaft output optimum line).

The third optimum fuel economy line shown in FIG. 9 is a set of engine operating points of minimizing the formula 3 on the equi-output power line and is an optimum fuel economy line (coolant heating optimum line) of focusing on an amount of heat for heating the coolant of the engine 10 (heat output). That is, the third optimum fuel economy line is a set of engine operating points in which the fuel consumption becomes minimal for the amount of heat for heating the coolant of the engine 10 among the engine operating points which are equal to each other in the shaft output of the engine 10.

The second optimum fuel economy line shown in FIG. 9 is a set of engine operating points of minimizing the formula 2 on the equi-output power line and is an optimum fuel economy line of focusing on the shaft output and the heat output of the engine 10. That is, the second optimum fuel economy line is a set of engine operating points in which the fuel consumption becomes minimal for the shaft output of the engine 10 and for the amount of heat for heating the coolant of the engine 10 among the engine operating points which are equal to each other in the shaft output of the engine 10.

Further, the second optimum fuel economy line is a line in which a fuel consumption rate is closer to the first optimum fuel economy line than the third optimum fuel economy line. In the formula 2, $\alpha$ is a control element of setting the weight of an efficiency relating to the shaft output, which is expressed by the formula 1, and an efficiency relating to the amount of heat for heating the coolant, which is expressed by the formula 3. If $\alpha$ is positive, by changing the magnitude of a, the position of an optimum line by the engine operating points of minimizing the formula 2 is moved between the first optimum fuel economy line and the third optimum fuel economy line. In the present embodiment, $\alpha$ is determined in such a way that the optimum line by the engine operating points of minimizing the formula 2 is set nearer to the engine operating points on the first optimum fuel economy line of the shaft output than the third optimum fuel economy line of the amount of heat for heating the coolant. The reason is to eliminate the following problem: if $\alpha$ is large, that is, the optimum line by the engine operating points of minimizing the formula 2 is near to the third optimum fuel economy line, the degree of decrease in the efficiency of the shaft output becomes very large, so there is presented a problem that as compared with an ordinary control of setting the engine operating point on the first optimum fuel economy line, the fuel consumption in the case of setting an equal shaft output is greatly increased to impair the fuel consumption and that an engine rotating speed is increased to increase sounds to thereby give an occupant a sense of discomfort.

Which of the first optimum fuel economy line and the second optimum fuel economy line is used at the time of setting the engine operating point is determined by whether or not the position of the target operating point (final operating point) of the SOC and the engine coolant after a given period of time is a position in which heat is short. That is, in a case where it is determined in a determination by a determination map shown in FIG. 8 in the energy management process that the position of the target operating point of the engine coolant is higher than a target lower limit and hence it is predicted that heat will be not short in a state after a given period of time, the first optimum fuel economy line is selected. On the other hand, in a case where it is determined that the position of the target operating point of the engine coolant is lower than the target lower limit and hence it is predicted that heat will be short in the state after the given period of time, the second optimum fuel economy line in which the amount of heat is increased more than the first optimum fuel economy line is selected. By selecting the second optimum fuel economy line, as compared with a case where the first optimum fuel economy line is selected, the heat output can be made larger and hence the state in which heat is short can be quickly eliminated.

Figure 11:
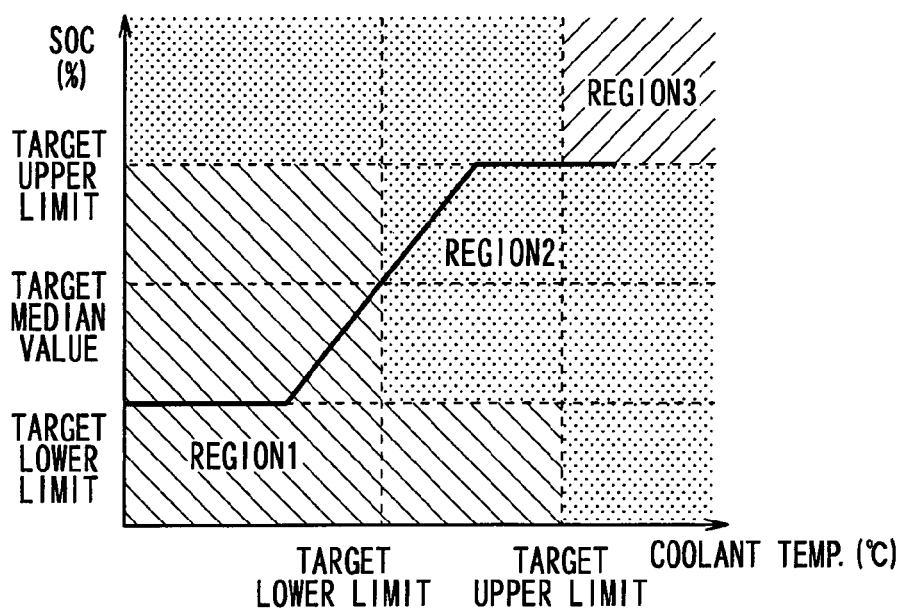
FIG. 11 is a determination map used at the time of selecting an engine operating point based on a state in which heat and electricity are excess or short in the embodiment.

Then, the engine operating point is selected on the first optimum fuel economy line or the second optimum fuel economy line on the basis of the acceleration/deceleration request by the driver. At this time, the engine operating point selected on the first optimum fuel economy line or the second optimum fuel economy line is different according to a state in which the heat is excess or short and to a state in which the electricity is excess or short. In FIG. 11 will be shown a determination map used when the engine operating point is selected on the basis of the state in which the heat is excess or short and the state in which the electricity is excess or short. FIG. 11 corresponds to FIG. 8.

As shown in FIG. 11, at the time of a region 2, an ordinary engine operating point is selected on the first optimum fuel economy line or the second optimum fuel economy line. Here, the ordinary engine operating point designates an engine operating point set in a case where neither the heat nor the electricity is excess or short and is hereinafter used in this meaning unless otherwise noted. At the time of a region 1 in which at least one of the heat and the electricity is short after a given period of time and in which neither the heat nor the electricity is excess after the given period of time, an engine operating point is selected which is shifted in a direction in which an engine output is more increased for the ordinary engine operating point. At the time of a region 3 in which both of the heat and the electricity are excess after the given period of time, an engine operating point is selected which is shifted in a direction in which the engine output is more decreased for the ordinary engine operating point. Here, the engine operating point which is shifted in the direction in which the engine output is more decreased includes also a state in which the engine is stopped.

Figure 12:
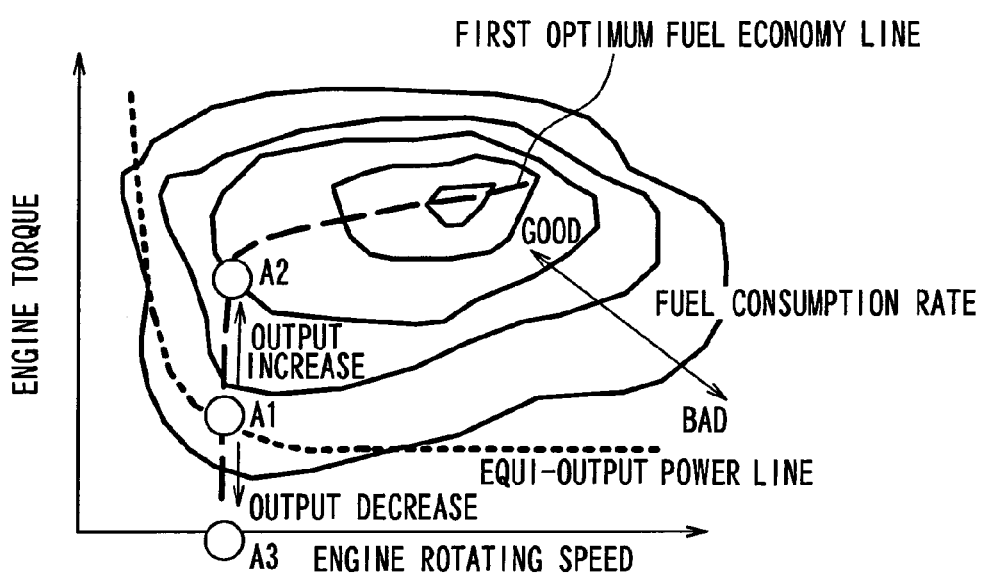
FIG. 12 is a map to show a concept of a method for selecting an engine operating point on the first optimum fuel economy line in the embodiment.

FIG. 12 shows the concept of a method of selecting an engine operating point on the first optimum fuel economy line. As shown in FIG. 12, in a case where the SOC of the battery 41 is low and where the electricity needs to be generated, an engine operating point A2 is set in which the engine output is larger than the ordinary engine operating point A1 and a difference between the shaft output of the engine and the driving force necessary for driving the vehicle is used for making the motor generator 11 generate the electricity. On the other hand, in a case where the SOC of the battery 41 is high and where the battery 41 needs to discharge the electricity, an engine operating point A3 is set in which the engine output is smaller than the ordinary engine operating point A1 and the electricity is consumed by driving the vehicle by means of the motor. The selection of the engine operating point on the second optimum fuel economy line is also performed in the same way.

The selection of the engine operating point on either of the first optimum fuel economy line or the second optimum fuel economy line can be realized by the use of a map using the first optimum fuel economy line and a map using the second optimum fuel economy line. The map using the first optimum fuel economy line includes: a map for selecting an ordinary engine operating point; a map for selecting an engine operating point in which an engine output is increased more than the ordinary engine operating point; and a map for selecting an engine operating point in which the engine output is decreased more than the ordinary engine operating point. On the other hand, the map using the second optimum fuel economy line includes: a map for selecting an ordinary engine operating point; and a map for selecting an engine operating point in which the engine output is increased more than the ordinary engine operating point.

Specifically, in a case where the position of a target operating point of the engine coolant is higher than a target lower limit of the engine coolant, and further: 1) in a case where the position of the target engine operating point belongs to a region 2 shown in FIG. 11, the ordinary map for selecting an engine operating point on the first optimum fuel economy line is used; 2) in a case where the position of the target engine operating point belongs to a region 1 shown in FIG. 11, the map for selecting an engine operating point which is located on the first optimum fuel economy line and in which the engine output is increased more than the ordinary engine operating point is used; and 3) in a case where the position of the target engine operating point belongs to a region 3 shown in FIG. 11, the map for selecting an engine operating point which is located on the first optimum fuel economy line and in which the engine output is decreased more than the ordinary engine operating point is used.

On the other hand, in a case where the position of the target engine operating point of the engine coolant is lower than the target lower limit of the engine coolant, and further: 1) in a case where the position of the target engine operating point belongs to the region 2 shown in FIG. 11, the ordinary map for selecting an engine operating point on the second optimum fuel economy line is used; and 2) in a case where the position of the target engine operating point belongs to the region 1 shown in FIG. 11, the map for selecting an engine operating point which is located on the second optimum fuel economy line and in which the engine output is increased more than the ordinary engine operating point is used.

In the examples shown in FIG. 5 and FIG. 6, the target engine operating point P4 is lower than the target lower limit of the engine coolant and belongs to the region 1 shown in FIG. 11, so that the map for selecting an engine operating point which is located on the second optimum fuel economy line and in which the engine output is increased more than the ordinary engine operating point is used.

As described above, in the present embodiment, in a case where the engine 10 is in an operating state and the coolant temperature is lower than a specified temperature at the time of setting a heating operation, on the assumption that the heating operation using at least one of the electric heating system 30 and the heater core 20 is performed for a given period of time, a distribution of the amount of heat for heating that the heater core 20 is to supply and the amount of heat for heating that the electric heating system 30 is to supply is set in such a way that an operating point of the SOC and the coolant temperature after a given prediction period becomes an operating point nearest to the target function shown in FIG. 3. When the heating operation using at least one of the heater core 20 and the electric heating system 30 is performed, the amount of heat for heating that the heater core 20 is to supply and the amount of heat for heating that the electric heating system 30 is to supply are controlled on the basis of this setting and the amount of heat of the engine coolant and the electricity of the battery are consumed, whereby a balance between the state of charge of the battery and the coolant temperature is controlled.

The target function shown in FIG. 3, as described above, is the straight line passing the median value of the target SOC range and the lower limit of the target coolant temperature and having the predetermined gradient a1. The gradient a1 is equal to a gradient of an approximate straight line when the relationship between the coolant temperature and the SOC in a case where, when the heating is OFF and a vehicle is driven in a driving pattern set in advance as a comparatively low load including a driving stop, an engine operating point is selected in such a way as to reduce a fuel consumption on the first optimum fuel economy line is expressed on the coordinate axes.

For this reason, in a case where the state of charge of the battery and the coolant temperature after the balance being controlled is not within a target range, by selecting an engine operating point on the first optimum fuel economy line or on the second optimum fuel economy line near to the first optimum fuel economy line, the state of charge of the battery and the coolant temperature can be made near to a specified value within a target range of the state of charge of the battery and to the lower limit of the target range of the coolant temperature, respectively.

Thus, according to the present embodiment, it is possible to supply the amount of heat necessary for the heating and to reduce the fuel consumption.

Modifications of the above embodiment will be described below.

(1) In the embodiment, as shown in FIG. 3, the target function is made a straight line having a predetermined gradient a1, and the predetermined gradient a1 is made equal to a gradient of an approximate straight line expressing changes in the coolant temperature and in the SOC in a case where an engine operating point on the first optimum fuel economy line is selected. However, the predetermined gradient may be made a change rate of an approximate line expressing changes in the coolant temperature and in the SOC in the case where the engine operating point on the first optimum fuel economy line is selected.

That is, in a case where the approximate line is not a straight line having a constant gradient but is expressed by a plurality of straight lines having different gradients, the different gradients may be used as the predetermined gradients. For example, the straight line having the predetermined gradient may be a straight line having a gradient a1 in a range in which temperature is lower than a given temperature and having a gradient a2 in a range in which the temperature is higher than the given temperature. Further, in a case where the approximate line is expressed by an approximate curved line, the straight line having the predetermined gradient may be a curved line having the same change rate as the approximate curved line.

(2) Further, in the embodiment, as shown in FIG. 3, the target function is made the straight line passing the median value of the target SOC range and the lower limit of the target range of the coolant temperature. However, the straight line may pass not the median value of the target SOC range but a given value within the target SOC range. Similarly, the straight line may pass not the lower limit of the target coolant temperature range but a given value within the target coolant temperature range.

(3) In the embodiment, the heat pump system 30 is employed as the electric heating system. However, in place of the heat pump system 30, a PTC heater can be also employed.

(4) In the embodiment, the vehicle control unit 51 sets the amount of heat for heating that the heater core 20 is to supply and the amount of heat for heating that the electric heating system 30 is to supply, and the air conditioning control unit 54 controls the amount of heat for heating that the heater core 20 is to supply and the amount of heat for heating that the electric heating system 30 is to supply. However, other control units may perform the setting and the control.

(5) In the embodiment, at the time of setting the engine operating point, in a case where the position of the target operating point of the SOC and the engine coolant temperature after a given period of time is a position in which the heat is short, the second optimum fuel economy line is selected. However, in a case where the position of the target operating point of the SOC and the engine coolant temperature after the given period of time is a position in which the heat is short and in which the electricity is adequate, the second optimum fuel economy line may be selected, and in the other cases, the first optimum fuel economy line may be selected. This is because by selecting the second optimum fuel economy line, an increase in the electricity can be reduced and a heat output can be increased as compared with a case of selecting the first optimum fuel economy line.

(6) The embodiment and its modifications described above may be combined with each other within a feasible range.

To sum up, the control device for a hybrid vehicle in accordance with the above embodiment may be described as follows.

In the first aspect of the disclosure, the control device is for a hybrid vehicle. The hybrid vehicle includes an engine 10, a battery 41, a motor generator 11, a heater core 20, and an electric heating system 30. The engine 10 is configured to output driving force for driving the vehicle and driving force for generating electricity. The battery 41 is charged with electricity and discharges electricity. The motor generator 11 is capable of outputting driving force for driving the vehicle by the electricity discharged from the battery 41 and is capable of generating electricity by the driving force outputted from the engine 10 to supply the battery 41 with electricity. The heater core 20 is configured to supply an interior of a compartment of the vehicle with heat for heating which is taken out of coolant of the engine 10. The electric heating system 30 is configured to supply the interior of the compartment of the vehicle with heat for heating by making use of the electricity supplied from the battery 41. The control device is disposed in the hybrid vehicle and includes a setting means 51 and a supplied heat amount control means 54. The setting means 51 is for setting an amount of heat for heating supplied by the electric heating system 30 and the heater core 20. When vehicle heating is in operation and coolant temperature is lower than a predetermined temperature, on an assumption that the vehicle heating using at least one of the electric heating system 30 and the heater core 20 is performed for a predetermined period of time, the setting means 51 sets the amount of heat for heating supplied by the electric heating system 30 and the heater core 20 in such a way that a state of charge of the battery 41 and the coolant temperature are arranged at a predetermined engine operating point after the predetermined period of time. The supplied heat amount control means 54 is for controlling the amount of heat for heating supplied by the electric heating system 30 and the heater core 20 based on the setting by the setting means 51. When expressed on a coordinate system having the state of charge of the battery 41 and the coolant temperature as its coordinate axes, the predetermined engine operating point is an engine operating point for the state of charge of the battery 41 and the coolant temperature, which is the closest to a line passing through a predetermined value in a target range of the state of charge of the battery 41 and a predetermined value in a target range of the coolant temperature and having a preset change rate, and which is settable within the predetermined period of time. The change rate is the same as a gradient of an approximate line that indicates changes of the state of charge of the battery 41 and the coolant temperature in a case of selection of any one of a set of engine operating points at which fuel consumption is minimal relative to shaft output of the engine 10 among engine operating points having the same shaft output of the engine 10 while the vehicle is traveling in a traveling pattern that is preset as a low-load drive of the vehicle including a travel stop of the vehicle when the vehicle heating is stopped.

In this way, according to the present disclosure, by adequately controlling the distribution between the amount of heat for heating that the heater core is to supply and the amount of heat for heating that the electric heating system is to supply, the amount of heat of the engine coolant and the electricity of the battery are consumed to thereby control a balance between the state of charge of the battery and the coolant temperature.

In this way, in a case where the state of charge of the battery and the coolant temperature are not within target ranges after controlling the balance between them, by selecting an engine operating point within or close to a range of a set of engine operating points which become minimal in the fuel consumption for the shaft output of the engine 10 among the engine operating points which are equal to each other in the shaft output of the engine 10, the state of charge of the battery and the coolant temperature can be brought near to a given value within the target range of the state of charge of the battery and to a given value within the target range of the coolant temperature, respectively, whereby both of them can be brought into the target ranges.

Thus, according to the present disclosure, the heat necessary for the heating can be supplied and at the same time the fuel consumption can be reduced.

In the second aspect of the disclosure, when the state of charge of the battery 41 is lower than an upper limit of the target range of the state of charge of the battery 41, the setting means 51 uses a first period as the predetermined period of time. When the state of charge of the battery 41 is higher than the upper limit, the setting means 51 uses a second period that is shorter than the first period as the predetermined period of time.

By the way, when the state of charge of the battery and the coolant temperature are arranged at a given operating point in a short time in the first aspect, the distribution between the amount of heat supplied by the electric heating system 30 and the amount of heat supplied by the heater core 20 is greatly changed. As a result, there is presented an issue that the amount of heat for heating supplied to the interior of the vehicle compartment is varied to impair comfortableness. In contrast, when the state of charge of the battery and the coolant temperature are arranged at a given operating point in a long time, in a case where the battery is overcharged, there is presented an issue that the amount of charge cannot be quickly reduced.

Thus, as described in second aspect, if the state of charge of the battery is lower than the upper limit of the target range of the state of charge of the battery, by setting the given period of time longer, it is possible to prevent the distribution between the amount of heat for heating supplied by the electric heating system 30 and the amount of heat for heating supplied by the heater core 20 from being greatly changed. Further, if the state of charge of the battery is higher than the upper limit of the target range of the state of charge of the battery, by setting the given period of time shorter, it is possible to quickly reduce the amount of charge and hence to keep the state of the battery adequate.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A control device for a hybrid vehicle including:
an engine that is configured to output driving force for driving the vehicle and driving force for generating electricity;
a battery that is charged with electricity and discharges electricity;
a motor generator that is capable of outputting driving force for driving the vehicle by the electricity discharged from the battery and is capable of generating electricity by the driving force outputted from the engine to supply the battery with electricity;
a heater core configured to supply an interior of a compartment of the vehicle with heat for heating which is taken out of coolant of the engine; and
an electric heating system configured to supply the interior of the compartment of the vehicle with heat for heating by making use of the electricity supplied from the battery, the control device disposed in the hybrid vehicle and comprising:
a setting means for setting an amount of heat for heating supplied by the electric heating system and the heater core, wherein when vehicle heating is in operation and coolant temperature is lower than a predetermined temperature, on an assumption that the vehicle heating using at least one of the electric heating system and the heater core is performed for a predetermined period of time, the setting means sets the amount of heat for heating supplied by the electric heating system and the heater core in such a way that a state of charge of the battery and the coolant temperature are arranged at a predetermined operating point after the predetermined period of time; and
a supplied heat amount control means for controlling the amount of heat for heating supplied by the electric heating system and the heater core based on the setting by the setting means, wherein:
when expressed on a coordinate system having the state of charge of the battery and the coolant temperature as its coordinate axes, the predetermined operating point is an operating point for the state of charge of the battery and the coolant temperature, which is the closest to a line passing through a predetermined value in a target range of the state of charge of the battery and a predetermined value in a target range of the coolant temperature and having a preset change rate, and which is settable within the predetermined period of time; and
the change rate is the same as a gradient of an approximate line that indicates changes of the state of charge of the battery and the coolant temperature in a case of selection of any one of a set of engine operating points at which fuel consumption is minimal relative to shaft output of the engine among engine operating points having the same shaft output of the engine while the vehicle is traveling in a traveling pattern that is preset as a low-load drive of the vehicle including a travel stop of the vehicle when the vehicle heating is stopped.

2. The control device according to claim 1, wherein:
when the state of charge of the battery is lower than an upper limit of the target range of the state of charge of the battery, the setting means uses a first period as the predetermined period of time; and
when the state of charge of the battery is higher than the upper limit, the setting means uses a second period that is shorter than the first period as the predetermined period of time.

* * * * *